US 9,542,856 B2

(12) United States Patent
Wyss et al.

(10) Patent No.: US 9,542,856 B2
(45) Date of Patent: Jan. 10, 2017

(54) METHOD AND SYSTEM FOR LEARNING CALL ANALYSIS (71) Applicant: Interactive Intelligence, Inc., Indianapolis, IN (US)

(72) Inventors: Felix Immanuel Wyss, Zionsville, IN (US); Matthew Alan Taylor, Indianapolis, IN (US); Kevin Charles Vlack, Ballwin, MO (US)

(73) Assignee: INTERACTIVE INTELLIGENCE GROUP, INC., Indianapolis, IN (US)

( * ) Notice: Subject to any disclaimer, the term of this patent is extended or adjusted under 35 U.S.C. 154(b) by 595 days.

(21) Appl. No.: 14/014,530

(22) Filed: Aug. 30, 2013

(65) Prior Publication Data

US 2014/0065582 A1 Mar. 6, 2014

Related U.S. Application Data (60) Provisional application No. 61/695,039, filed on Aug. 30, 2012.

(51) Int. Cl.
*H04M 3/42* (2006.01)
*G09B 19/00* (2006.01)
*G10L 25/48* (2013.01)
*H04M 3/51* (2006.01)
*G10L 25/51* (2013.01)

(52) U.S. Cl.
CPC .............. *G09B 19/00* (2013.01); *G10L 25/48* (2013.01); *H04M 3/5158* (2013.01); *G10L 25/51* (2013.01); *H04M 2203/6054* (2013.01)

(58) Field of Classification Search
USPC .................................................... 379/218.01
See application file for complete search history.

(56) References Cited

U.S. PATENT DOCUMENTS

| 6,990,179 | B2 | 1/2006 | Merrow et al. |
| 7,257,536 | B1 | 8/2007 | Finley et al. |
| 7,363,228 | B2 | 4/2008 | Wyss et al. |
| 7,516,074 | B2 | 4/2009 | Bilobrov |

(Continued)

FOREIGN PATENT DOCUMENTS

| GB | 2 487 734 A | 8/2012 |
| GB | 2487734 | 8/2012 |

(Continued)

OTHER PUBLICATIONS

International Search Report mailed on Apr. 16, 2014 in related international application PCT/US13/57446 filed Aug. 30, 2013.

(Continued)

*Primary Examiner* — Quynh Nguyen (57) ABSTRACT

A system and method are presented for learning call analysis. Audio fingerprinting may be employed to identify audio recordings that answer communications. In one embodiment, the system may generate a fingerprint of a candidate audio stream and compare it against known fingerprints within a database. The system may also search for a speech-like signal to determine if the end point contains a known audio recording. If a known audio recording is not encountered, a fingerprint may be computed for the contact and the communication routed to a human for handling. An indication may be made as to if the call is indeed an audio recording. The associated information may be saved and used for future identification purposes.

11 Claims, 3 Drawing Sheets

(56) References Cited

U.S. PATENT DOCUMENTS

| | | |
|---|---|---|
| 7,600,676 B1 | 10/2009 | Rados et al. |
| 7,698,140 B2 | 4/2010 | Bhardwaj et al. |
| 7,738,635 B2 | 6/2010 | Groves et al. |
| 7,797,249 B2 | 9/2010 | Schmelzer et al. |
| 7,894,589 B2 | 2/2011 | Bedingfield, Sr. |
| 8,005,675 B2 | 8/2011 | Wasserblat et al. |
| 8,014,498 B2 | 9/2011 | Malik |
| 8,046,213 B2 | 10/2011 | Bakis et al. |
| 8,145,481 B2 | 3/2012 | Gajic et al. |
| 8,180,834 B2 | 5/2012 | Kay et al. |
| 8,233,604 B2 | 7/2012 | Lei |
| 2004/0037397 A1 | 2/2004 | Roby |
| 2006/0104433 A1 | 5/2006 | Simpson et al. |
| 2006/0254409 A1 | 11/2006 | Withop |
| 2011/0311095 A1 | 12/2011 | Archer |
| 2012/0195415 A1 | 8/2012 | Wyss et al. |

FOREIGN PATENT DOCUMENTS

| | | |
|---|---|---|
| JP | 2006217386 A | 8/2006 |
| WO | 2005013014 A1 | 2/2005 |
| WO | 2013/148069 A1 | 10/2013 |

OTHER PUBLICATIONS

Supplementary European Search Report mailed on Mar. 30, 2016 in related European patent application 13 833 393A.
First Office Action mailed Jul. 5, 2016 by JPO in related Japanese Application 2015-530078, related to PCT application PCT/US13/57446, filed Aug. 30, 2013, related to the instant application.
First Examination Report mailed Oct. 13, 2016 by New Zealand Intellectual Property Office in related New Zealand Application 705077, related PCT application PCT/US13/57446, filed Aug. 30, 2013, related to the instant application.

METHOD AND SYSTEM FOR LEARNING CALL ANALYSIS

BACKGROUND

The present invention generally relates to telecommunication systems and methods. More particularly, the present invention pertains to the detection of recorded audio by automated dialer systems in contact centers.

SUMMARY

A system and method are presented for learning call analysis. Audio fingerprinting may be employed to identify audio recordings that answer communications. In one embodiment, the system may generate a fingerprint of a candidate audio stream and compare it against known fingerprints within a database. The system may also search for a speech-like signal to determine if the end point contains a known audio recording. If a known audio recording is not encountered, a fingerprint may be computed for the contact and the communication routed to a human for handling. An indication may be made as to if the call is indeed an audio recording. The associated information may be saved and used for future identification purposes.

In an embodiment, a system for learning call analysis is presented, comprising: a telephony service module; a database storing a record associated with each of a plurality of contacts, each contact of the plurality of contacts being associated with a telephone number, the database further storing a plurality of acoustic fingerprints, each acoustic fingerprint of the plurality of acoustic fingerprints being associated with at least one contact of the plurality of contacts; a media server, the media server configured to receive one or more acoustic fingerprints of the plurality of acoustic fingerprints associated with one of the plurality of contacts; one or more workstations; an automated dialer, the automated dialer being configured to dial the telephone number associated with the record and establish a communication with the one contact; a network operatively coupled to the telephony service module, the database, the media server, the one or more workstations, and the automated dialer for exchange of data there between; wherein the media server is further configured to detect whether any of the one or more acoustic fingerprints of the plurality of acoustic fingerprints is present in audio of the communication; and wherein the media server is further configured to handle the communication in a first manner in the event none of the one or more acoustic fingerprints of the plurality of acoustic fingerprints are present in the audio and handle the communication in a second manner in the event that at least one of the one or more acoustic fingerprints of the plurality of acoustic fingerprints is present in the audio.

In another embodiment, a method for call learning in a communication system, is presented, comprising the steps of: selecting a contact from a database, the contact being associated with a telephone number and one or more acoustic fingerprints; retrieving, from the database, the one or more acoustic fingerprints and the telephone number associated with the contact; initiating a communication with the contact based on the telephone number, the communication generating audio; analyzing the audio for matches to any of the one or more of the acoustic fingerprints; and routing the communication based on the analyzing step, wherein the communication is handled in a first manner in the event that none of the one or more acoustic fingerprints are present in the audio and the communication is handled in a second manner in the event that at least one of the one or more fingerprints is present in the audio.

In another embodiment, a method for call learning in a communication system is presented, comprising the steps of: selecting one or more contacts from a database; performing a lookup for existing acoustic fingerprints associated with each of the one or more contacts in the database; initiating a communication with one of the one or more contacts; determining whether any of the existing acoustic fingerprints associated with the contact is present in audio from the communication; in the event that none of the existing acoustic fingerprints are present in the audio, computing a new acoustic fingerprint; and associating the new acoustic fingerprint with the contact in the database.

In yet another embodiment, a method for routing communications in a communication system is presented, comprising the steps of: initiating a communication with a contact; and determining whether said contact is associated with a known target wherein: if said contact is not associated with a known target, routing said communication to a human, and performing an action, and if said contact is associated with a known target, analyzing audio of said communication for any of a plurality of known acoustic fingerprints associated with the known target and performing an other action.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In an embodiment of a contact center scenario, outbound communications, such as phone calls may be made automatically by a class of devices known as "automated dialers" or "autodialers". In another embodiment of a contact center scenario, outbound communications may also be placed manually. A number of humans, or agents, may be available to join into communications that are determined to reach a live person. When a call is initiated, a determination may be made as to whether the call was answered by a live speaker. A contact center may become more efficient by not having agents involved in a communication until it is determined that there is a live person at the called end with whom the agent may speak.

Answering machine detection (AMD) is critical to contact centers utilizing automated dialer systems because most calls placed often result in pre-recorded audio from a machine or other automated system. Every audio recording or other automated system that is incorrectly detected as a live speaker may be routed to an agent for handling. As a result, agents may begin to assume an audio recording is at the other end of the call and mistakenly hang up on a live person, sound surprised, lose their train of thought, etc. AMD employs various signal processing algorithms to classify the entity that picks up a communication into categories, for example, such as answering machines, or recorded audio, and live speakers. The accuracy of these algorithms may depend on various parameters and requires trading off AMD rate and live speaker detection (LSD) rate. For example, biasing an autodialer towards a high AMD rate may result in more live speakers being classified incorrectly as recorded audio and hung-up on by the autodialer and vice-versa.

Some countries as well as applications, such as high-value dialing for example, do not allow or utilize AMD because of false positives. An example of a false positive may include a live speaker who is classified as an answering machine. As a result, AMD may be disabled or tuned heavily toward LSD. A large number of audio recordings may thus be routed to agents.

In another example, an autodialer operation may contact the same phone number multiple times in a day to try and reach a live speaker. If the called number connects to an audio recording that call analysis cannot correctly detect. For example, the audio recording "Hi <long pause> We aren't available right now . . ." may result in the system not detecting that a human is not speaking. As a result, each time that number is dialed it may be mistakenly routed to an agent. By learning the fingerprint of a specific audio recording, the autodialer may prevent an audio recording from being repeatedly routed to an agent. If an audio recording associated with a contact is altered, however, the system may have to relearn the fingerprint of the audio recording the next time that number is dialed. This information may be added to the record of the contact and stored for future use.

A fingerprint, in the field of Acoustic Fingerprinting, may be a passive unique trait to identify a particular thing. A system may generate a fingerprint of a candidate audio stream and compare the newly generated fingerprint against a database of known fingerprints. The fingerprints may be used in communications systems for routing purposes. Humans may want to increase the opportunity to interact with another human instead of with an audio recording. Thus, contacts having fingerprints identifying audio recordings may not be handled by a human and routed otherwise, for example.

By learning about audio recordings that are missed, learning call analysis, in one embodiment, allows contact centers using automated dialers to turn down their AMD bias and turn up their LSD bias. As a result, contact centers may be able to maximize the number of live speakers that are routed to agents. The contact center may become aware that the increased number of audio recordings that initially come through to agents. The audio recordings may be marked as a recording and may subsequently not be re-routed to agents when they are recognized.

Figure 1:
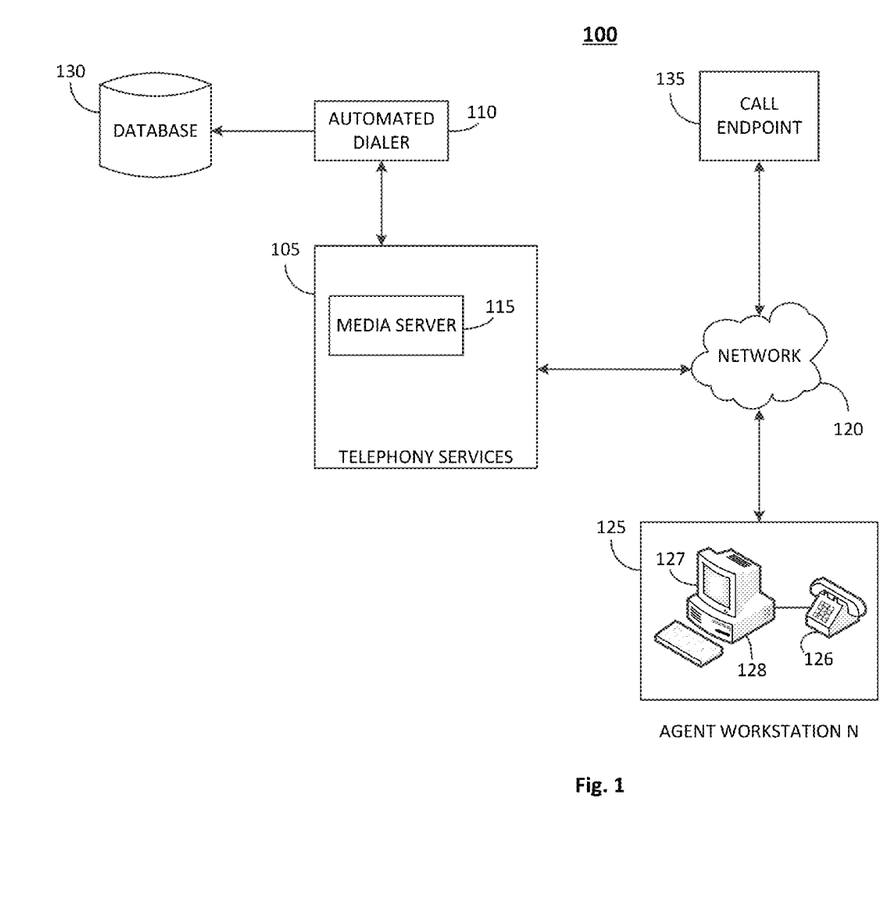
FIG. 1 is a diagram illustrating the basic components of an embodiment of a learning call analysis system.

FIG. 1 is a diagram illustrating the basic components in an embodiment of a learning call analysis system, indicated generally at 100. The basic components of a system 100 may include: a telephony services module 105, which may include a media server 115; an automated dialer 110; a network 120; an agent workstation 125, which may include a work station computer 128 coupled to a display 127, and a telephone 126; a database 130; and a call endpoint 135.

The telephony services module 105 may include a media server 115. In one embodiment, the telephony services module 105 may comprise an application programming interface (API) that receives audio recording fingerprints through the automated dialer 110 and sends the fingerprints to the media server 115 when placing a call. The media server 115 may receive answering audio recording fingerprints and use them as part of the call analysis. The media server 115 may also be able to generate fingerprints and send these to the telephony services module 105 when requested.

In one embodiment, the automated dialer 110 may comprise a device that automatically dials telephone numbers. In another embodiment, the automated dialer may comprise software. An example may be Interactive Intelligence, Inc.'s, Interaction Dialer®. In one embodiment, the automated dialer 110 may have a lookup or caching mechanism that matches phone numbers, or other contact information, to existing audio recording fingerprints for communications about to be placed. In one embodiment, when a call is sent to an agent and identified as an audio recording, the automated dialer 110 may request the fingerprints for that call from the telephony services 105 and media server 115 and update database tables.

The network 120 may be in the form of a VoIP, a network/internet based voice communication, PTSN, mobile phone network, Local Area Network (LAN), Municipal Area Network (MAN), Wide Area Network (WAN), such as the Internet, a combination of these, or such other network arrangement as would occur to those skilled in the art. The operating logic of system 100 may be embodied in signals transmitted over network 120, in programming instructions, dedicated hardware, or a combination of these. It should be understood that any number of computers 128 can be coupled together by network 120.

The agent workstation 125 may include a work station computer 128 coupled to a display 127. Workstation computers 128 may be of the same type, or a heterogeneous combination of different computing devices. Likewise, displays 127 may be of the same type or a heterogeneous combination of different visual devices. It should be understood that while one work station 125 is described in the illustrative embodiment, more may be utilized. Contact center applications of system 100 typically include many more workstations of this type at one or more physical locations, but only one is illustrated in FIG. 1 to preserve clarity. In another embodiment, agents may not even be utilized, such as in a system that regularly leaves messages, but provides an IVR with a message and options if a live speaker is encountered. Further it should be understood that while a contact center is mentioned and agents are referred to, it is within the scope of this material not to limit application to a contact center setting.

A digital telephone 126 may be associated with agent workstation 125. Additionally, a digital telephone 126 may be integrated into the agent computer 128 and/or implemented in software. It should be understood that a digital telephone 126, which is capable of being directly connected to network 100, may be in the form of handset, headset, or other arrangement as would occur to those skilled in the art. It shall be further understood that the connection from the network 120 to an agent workstation 125 can be made first to the associated workstation telephone, then from the workstation telephone to the workstation computer by way of a pass through connection on the workstation telephone. Alternatively, two connections from the network can be made, one to the workstation telephone and one to the workstation computer. Although not shown to preserve clarity, an agent workstation 125 may also include one or more operator input devices such as a keyboard, mouse, track ball, light pen, tablet, mobile phone and/or microtelecommunicator, to name just a few representative examples. Additionally, besides display 127, one or more other output devices may be included such as loudspeaker(s) and/or a printer.

The database 130 may house the automated dialer 110 records. The records contained in the database 130 may enable the system 100 to determine whether a fingerprint is present The records may also enable the system to determine whether an audio recording is present at the other end of a communication.

In one embodiment, the call endpoint 135 may represent the endpoint of a call placed by the system through the network 120 and there is an answer. The answer may be by any entity, such as a live speaker or an audio recording, for example.

Figure 2:
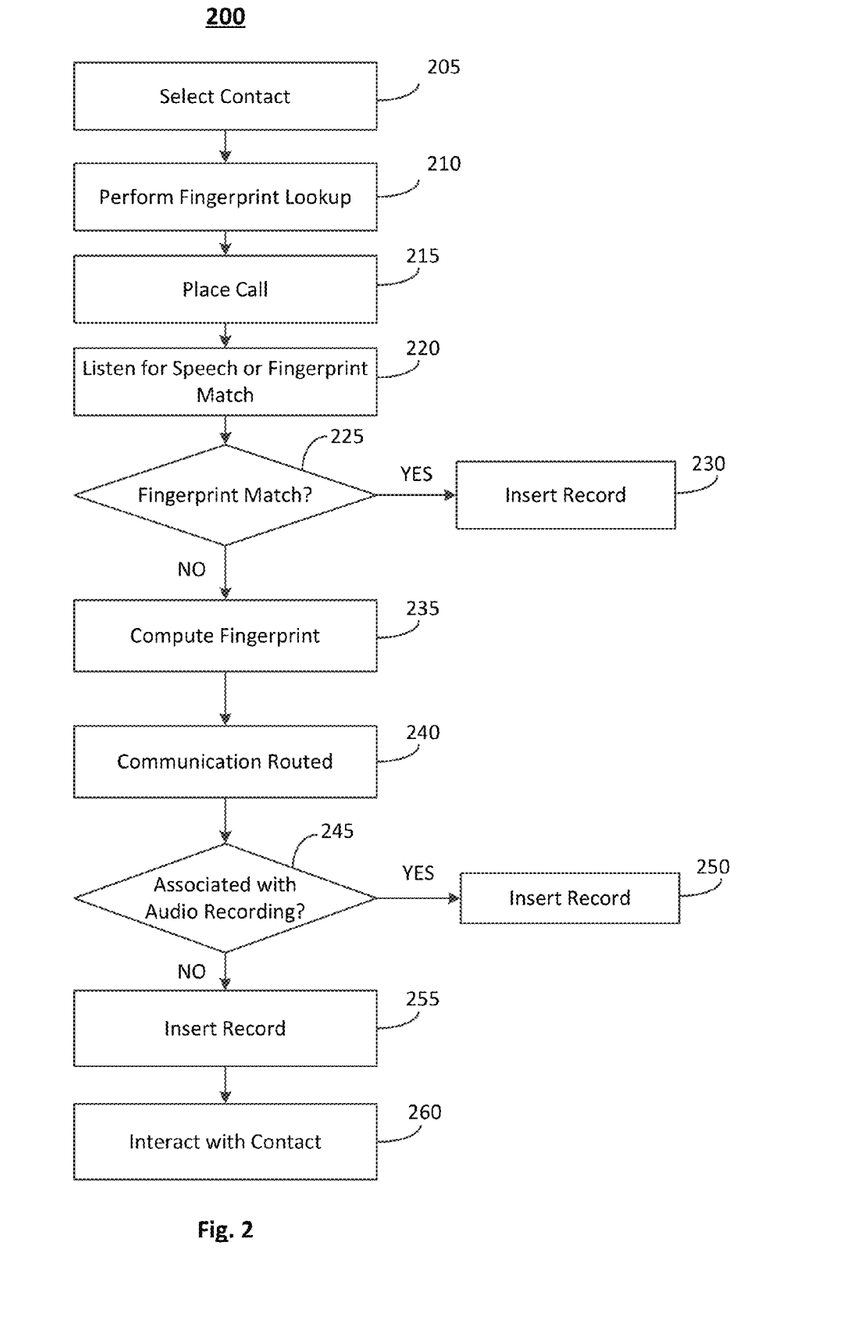
FIG. 2 is a flowchart illustrating an embodiment of the process of call learning.

As illustrated in FIG. 2, a process 200 for illustrating call learning is provided. The process 200 may be operative in any or all of the components of the system 100 (FIG. 1).

In step 205, a contact is selected for communication. For example, telephone numbers and matches are cached. In one embodiment, when telephone numbers that are to be dialed are cached, the automated dialer may also cache any fingerprint matches that are found within the system. In one embodiment, multiple fingerprints per contact may be stored. Instances of multiple fingerprints may occur when audio recordings play different announcements based on the time of day or the day of the week, for example. Control is passed to operation 210 and the process 200 continues.

In operation 210, a fingerprint look up is performed for the selected contacts. For example, there may be a fingerprint for any given telephone number of a contact, such as the fingerprint of the audio recording that an agent experienced when a call was placed to that number. In some instances, a telephone number may result in more than one audio recording such as with call forwarding. In at least one embodiment, fingerprints may be found using the telephone number as a reference or via other forms of identification such as a name, customer ID, etc. Control is passed to operation 215 and the process 200 continues.

In operation 215, a call is placed. For example, the call may be performed via the telephony services. In one embodiment, the automated dialer may supply the fingerprint in the API call when the call is initiated. The telephony services may then relay any fingerprints associated with the telephone number to the media server that were identified in the fingerprint lookup. In at least one embodiment, fingerprints may include those of voice mail systems, answering machines, network messages, etc., or any other type of answering service or audio recording. Control is passed to operation 220 and the process 200 continues.

In operation 220, the media server listens for speech or a fingerprint match. In one embodiment, the fingerprints may indicate that the system has encountered the same audio recording previously. The fingerprint may also indicate that the message has changed in the recording. Control is passed to step 225 and process 200 continues.

In operation 225, it is determined whether there is a fingerprint match. If it is determined that there is a fingerprint match, then control is passed to operation 230 and process 200 continues. If it is determined that there is not a fingerprint match, then control is passed to operation 235 and process 200 continues.

The determination in operation 225 may be made based on any suitable criteria. For example, when the media server encounters a recording that has a familiar fingerprint, i.e., it has been learned, then the media server may inform telephony services which in turn may inform the automated dialer that there is a match. If a match for the fingerprint is found, this may indicate an audio recording. However, if there is no match, then the fingerprint could indicate a live person or a changed recording and this will have to be determined by other means, such as the agent. In one embodiment, the agent may indicate in the record the entity at the other end of the call.

In operation 230, a record may be inserted for that telephone number. For example, a record may be inserted into FIG. 4 indicating that the type is "d", indicating that an audio recording has been detected and the process ends. In one embodiment, other actions may be performed such as disconnecting the communication, scheduling another communication to occur at a later point in time, leaving a message on an answering machine, determining an alternate contact to try, and routing the communication to a handler.

In operation 235, a fingerprint is computed for the telephone number. For example, a unique identifier may be created for the contact. Control is passed to step 240 and process 200 continues.

In operation 240, the communication is routed. For example, a call may be routed to an agent within a contact center. Control is passed to step 245 and process 200 continues.

In operation 245, it is determined whether the end point of the contact has been associated with an audio recording. If it is determined that the end point of the communication is an audio recording, then control is passed to operation 250 and process 200 continues. If it is determined that the end point of the call is not an audio recording, then control is passed to operation 255 and process 200 continues.

The determination in operation 245 may be made based on any suitable criteria. For example, records within the database may be examined. In one embodiment, if a live speaker call is dispositioned by an agent with a wrap-up code indicating that an audio recording has been routed to the agent, then the autodialer requests the audio recording fingerprint from telephony services/media server and writes it to the database. The autodialer may then take the telephone number and the corresponding fingerprint and look it up as described in FIG. 3 below. If the combination of the contact number and fingerprint is found, then the information illustrated in FIG. 4 below may be supplemented. In one embodiment, the indicator "Fingerprint missed" may be input in the record because call analysis should have detected this call as an audio recording, but failed to. If the combination is not found, then the autodialer looks up the contact number. If that record is found, then the autodialer may overwrite the fingerprint for that contact record. Alternatively, multiple fingerprints may be kept according to rules such as the maximum age, maximum number, etc. The autodialer may also insert a type into a record (FIG. 4) indicating that the fingerprint has changed even though the record has been found. For example, in one embodiment, an audio recording may have changed, such as a person changing the message on their answering machine. In another embodiment, the fingerprint of the communication may be added to the database even if a live caller is detected. Storing such information may serve to ensure the agents are not skewing their statistics by pretending to talk to a person and letting an answering machine record the conversation.

In operation 250, a record is inserted associating a contact with a fingerprint and the process ends. In at least one embodiment, multiple fingerprints may be associated with a number. Multiple fingerprints may result in instances where, for example, different audio recording may be played based on the time of day or the day of the week.

Figure 3:
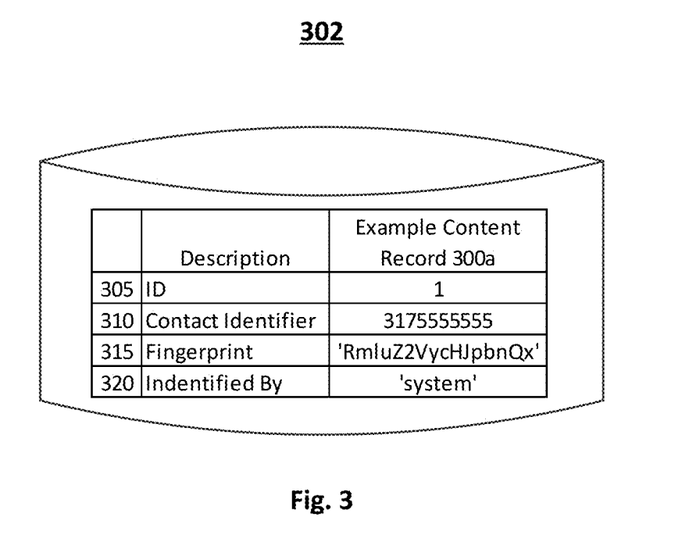
FIG. 3 is a table illustrating an embodiment of an automated dialer record.

In operation 255, a record is inserted. For example, if a phone number is not found, the autodialer may insert a new record into the existing record, of which an embodiment is illustrated in FIG. 3, which includes the ID of the agent that dispositioned the call as an audio recording. The record illustrated in FIG. 4 may also contain information inserted indicating that the communication was a type of "initial detect", which may indicate that an audio recording is being encountered for the first time and a fingerprint is being added. Control is passed to operation 260 and the process 200 continues.

In operation 260, an agent interacts with the contact, which may be a live person, and the process ends.

FIG. 3 illustrates an embodiment of an autodialer record table, indicated generally at 302. The autodialer record table 302 may be composed of a number of autodialer records 300. While only record 300a has been illustrated in FIG. 3, any number of records 300 may be provided. An autodialer record 300 may be associated with or resident in the database 130 (FIG. 1). An autodialer record 300 may include an ID field 305, a Contact Identifier field 310, a Fingerprint field 315, and an Identified By field 320.

The ID field 305 may contain a record ID, which is necessarily unique and preferably used consistently. In at least one embodiment, this field may be a primary key. Using the example shown in FIG. 3, record 300a has an ID of 1.

The Contact Identifier field 310 may contain the telephone number of the contact. This number may have a specified format, such as all digits. Using the example shown in FIG. 3, Record 300a contains a value of "3175555555" for the telephone number field 310.

The Fingerprint field 315 may contain the fingerprint converted into some form convenient for storage in the database record as would occur to those skilled in the art. It may be fixed or of a variable length or format or comprise a reference to external storage, for example. Although particular examples of fingerprints are presented herein, any sort of unique identifier may be used without departing from the scope of the embodiments herein. Using the example shown in FIG. 3, record 300a contains a fingerprint field 315 value of "RmluZ2VycHJpbnQx".

The Identified By field 320 may contain information relating to the means by which the communication was addressed. For example, the field may contain information about how the call was answered. In one embodiment, this information in the record could include the user ID of the agent that identified this fingerprint as an audio recording or it may indicate that the system identified the fingerprint as an audio recording. Using the example shown in FIG. 3, record 300a contains an identified by field 320 value of "system", which may indicate that the communication was identified by the system as an audio recording.

Figure 4:
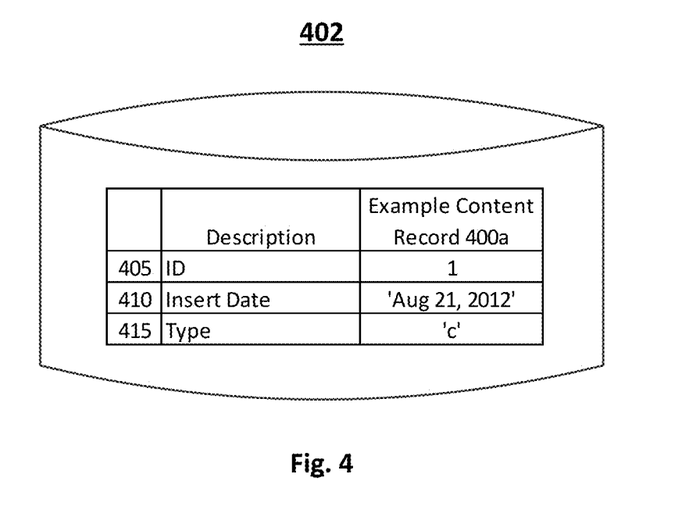
FIG. 4 is a table illustrating an embodiment of an automated dialer record.

FIG. 4 is a table illustrating an embodiment of an autodialer record table, indicated generally at 402. The autodialer record table 402 may be composed of a number of autodialer records 400. While only record 400a has been illustrated in FIG. 4, any number of records 400 may be provided. An autodialer record 400 may be associated with or resident in the database 130 (FIG. 1). An autodialer record 400 may include an ID field 405, an Insert Date Field 410, and a Type field 415.

The ID field 405 may contain a record ID, which is necessarily unique and preferably used consistently. A record ID may indicate an identifier that is used relevant to each contact account. Although particular examples of IDs are presented herein, any sort of unique identifier may be used without department from the scope of the embodiments herein. In at least one embodiment, this field may be a primary key. Using the example shown in FIG. 3, record 400a has an ID of 1.

The Insert Date Field 410 may contain the date of the record. In at least one embodiment, this information may have a specified format, such as Aug. 21, 2012. Using the example shown in FIG. 4, record 400a contains a value of "Aug. 21, 2012" for the insert date field 410.

The type filed 415 may contain information about the call from the system. In at least one embodiment, the call may be expressed in values. For example, "i" for an "initial detect", "d" for "detect", "c" for "detect/fingerprint changed", or "m" for "fingerprint missed". An "initial detect" may describe an audio recording that is being encountered for the first time. "Detect" may describe that an audio recording has been detected and the associated fingerprint. "Detect/fingerprint changed" may indicate that an audio recording has been detected but the fingerprint has changed. An example may include a newly recorded message on an answering machine. "Fingerprint missed" may indicate a combination of a phone number and a fingerprint matching an existing entry in the table yet the media server did not detect the recording as such. Although particular examples are presented herein, any sort of unique identifier may be used without departing from the scope of the embodiments herein. Using the example shown in FIG. 4, record 400a contains a value of "c", which may indicate that an audio recording has been detected but the fingerprint has changed.

Periodically, a contact center may run a script on the record tables in FIGS. 3 and 4 in the database to remove old contacts that have not been called in a specified period of time (e.g., 2 years). Reports may also be generated that can identify such information as to how many audio recordings were not routed to an agent on a given day. Administrators may also periodically run reports on agents with high numbers of associated fingerprints to see if they are mischaracterizing live speakers as audio recordings or vice versa.

In at least one embodiment, to avoid routing answering machines or recorded audio incorrectly classified as a live caller for contacts where the system does not yet have a fingerprint record of the audio recording stored in its database, the algorithmic classification into live caller and audio recording would not be used. Instead, a call to the new telephone number would be placed. The call analysis system may search for a speech-like signal and for fingerprint matches. If there is no matching fingerprint, a fingerprint may be created of the signal and the call disconnected. A message may optionally be played before disconnecting or some other means of handling the call may be employed. The number may be called again at some point in time and if the fingerprint matches, then it can be determined whether the end point is an audio recording. If the fingerprint does not match, then the end point may be a live caller or an audio recording. If the contact attempt results in a live caller, the fingerprint may not be stored in the database. Any subsequent contact attempt to that number would want to utilize the same algorithm again (i.e. call first, take the fingerprint, and call back) as it may be that only confirmed audio recordings, such as where there was a positive fingerprint match in the subsequent call for example, would be stored in the database. For numbers where the system does not yet have a fingerprint of the audio recording, the system may employ statistical or heuristic models to determine the time to place the call where the likelihood of reaching a machine is highest such as when the likelihood of reaching a live caller is lowest. This is in contrast to contacts where fingerprints are present and the system would place communications to maximize the likelihood of reaching a live caller.

In one embodiment, if a fingerprint match is made between a communication endpoint and an existing record in the database, one or more alternate contacts may be used for that record in an attempt to reach a desired endpoint, such as a human. For example, the "Find Me/Follow Me" feature could be employed where several telephone numbers are on record for the same contact. When attempting to locate the contact, the system places calls to these numbers in some order until it reaches the human. After having learned the fingerprints the first time a particular recording is encountered, the system may subsequently be able to identify numbers where an automated system, such as an answering machine or voice mail system, answers without the risk of false-positives of non-fingerprint based AMD.

In one embodiment, where contact centers want to ensure a live caller is not incorrectly classified as an audio recording, calls to numbers for which there is no fingerprint in the database may be performed with AMD disabled. Instead, the call analysis may look for the first utterance represented as a speech-like signal. A fingerprint may be created of the first utterance and returned to the telephony services. The call may then be routed to an agent. When the agent indicates the call end point is an audio recording, the fingerprint may be added to the database for that number. When a number is subsequently called for which an audio recording fingerprint exists, this is passed to the media server. If speech is encountered that matches any of the fingerprints, then it can be determined this may be an audio recording, otherwise, everything else is assumed to be a live caller and the call is passed to agents.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:
1. A system for learning call analysis comprising:
a. a telephony service module;
b. a database storing a record associated with each of a plurality of contacts, each contact of the plurality of contacts being associated with a telephone number, the database further storing a plurality of acoustic fingerprints, each acoustic fingerprint of the plurality of acoustic fingerprints being associated with at least one contact of the plurality of contacts;
c. a media server, the media server configured to receive one or more acoustic fingerprints of the plurality of acoustic fingerprints associated with one of the plurality of contacts;
d. one or more workstations;
e. an automated dialer, the automated dialer being configured to dial the telephone number associated with the record and establish a communication with the one contact;
f. a network, operatively coupled to the telephony service module, the database, the media server, the one or more workstations, and the automated dialer for exchange of data there between;
g. wherein the media server is further configured to detected whether any of the one or more acoustic fingerprints of the plurality of acoustic fingerprints is present in audio of the communication; and
h. wherein the media server is further configured to handle the communication in a first manner in the event none of the one or more acoustic fingerprints of the plurality of acoustic fingerprints are present in the audio and handle the communication in a second manner in the event that at least one of the one or more acoustic fingerprints of the plurality of acoustic fingerprints is present in the audio.

2. The system of claim 1, wherein said telephone service module comprises an application programming interface that receives audio recording fingerprints.

3. The system of claim 1, wherein a workstation comprises:
a. a display;
b. a computer coupled to the display;
c. a digital telephone integrated into the computer and capable of being directly connected to the network; and
d. at least one operator input device.

4. The system of claim 1, wherein said database is capable of housing automated dialer records that enable the system to determine at least one of: whether any of the plurality of fingerprints is present in the audio and whether an audio recording is present in the audio.

5. The system of claim 1, wherein the media server is further configured to generate one or more new acoustic fingerprints based on the audio and insert the one or more new acoustic fingerprints into the database in association with one of the plurality of contacts.

6. The system of claim 5, wherein said media server is capable of providing each of the new acoustic fingerprints to the telephony service module.

7. The system of claim 1, wherein the first manner includes routing the communication to a human.

8. The system of claim 1, wherein the second manner includes disconnecting the communication.

9. A method for routing communications in a communication system, wherein the telecommunication system comprises at least an automated dialer and a telephony service module operatively coupled over a network, the method, comprising the steps of:
a. initiating a communication with a contact, by the automated dialer;
and
b. determining whether said contact is associated with a known target, by the telephony services module, wherein:
i. if said contact is not associated with a known target, routing said communication to a human, and performing an action, wherein the action comprises the steps of:
classifying said contact as a specific target;
creating a fingerprint associated with said target; and
storing said fingerprint in the database in associated with said target, and
ii. if said contact is associated with a known target, analyzing audio of said communication for any of a plurality of known acoustic fingerprints associated with the known target, and performing an other action wherein the other action comprises performing at least one of the following: disconnecting the communication, scheduling another communication at a new time, leaving a message with a means for answering a communication, routing the communication to a human, and determine an alternate contact and repeat process.

10. The method of claim 9, wherein said classifying as a specific target comprises a human denoting the target as an audio recording.

11. The method of claim 9, wherein said initiating a communication comprises placing calls by means of an automated dialing system in a contact center.

* * * * *